(12) United States Patent
Cheng

(10) Patent No.: US 12,023,834 B2
(45) Date of Patent: Jul. 2, 2024

(54) MOLD LATCH AND MOLD HAVING MOLD LATCH

(71) Applicant: DME COMPANY LLC, Madison Heights, MI (US)

(72) Inventor: Peng Cheng, Troy, MI (US)

(73) Assignee: DME COMPANY LLC, Madison Heights, MI (US)

( * ) Notice: Subject to any disclaimer, the term of this patent is extended or adjusted under 35 U.S.C. 154(b) by 286 days.

(21) Appl. No.: 17/379,034

(22) Filed: Jul. 19, 2021

(65) Prior Publication Data

US 2022/0016817 A1    Jan. 20, 2022

Related U.S. Application Data

(60) Provisional application No. 63/053,893, filed on Jul. 20, 2020.

(51) Int. Cl.
*B29C 45/00* (2006.01)
*B29C 45/26* (2006.01)
*B29C 45/64* (2006.01)

(52) U.S. Cl.
CPC ........ *B29C 45/2602* (2013.01); *B29C 45/641* (2013.01); *B29C 2045/2604* (2013.01)

(58) Field of Classification Search
None
See application file for complete search history.

(56) References Cited

U.S. PATENT DOCUMENTS

2022/0396019 A1* 12/2022 Ciccone .............. B29C 45/2602

OTHER PUBLICATIONS

DME Co "External Latch Lock" Jun. 4, 2015 https://www.youtube.com/watch?v=Z34UfXzHKoM (Year: 2015).*

* cited by examiner

*Primary Examiner* — Jacob T Minskey
*Assistant Examiner* — Adrien J Bernard
(74) *Attorney, Agent, or Firm* — Dinsmore & Shohl LLP

(57) ABSTRACT

A mold latch having a latch bar and a traveler with two linear followers that can co-act with the latch bar to enable a mold plate, to which the traveler is attached, to translate together in a direction with another mold plate, to which latch bar is attached.

10 Claims, 13 Drawing Sheets

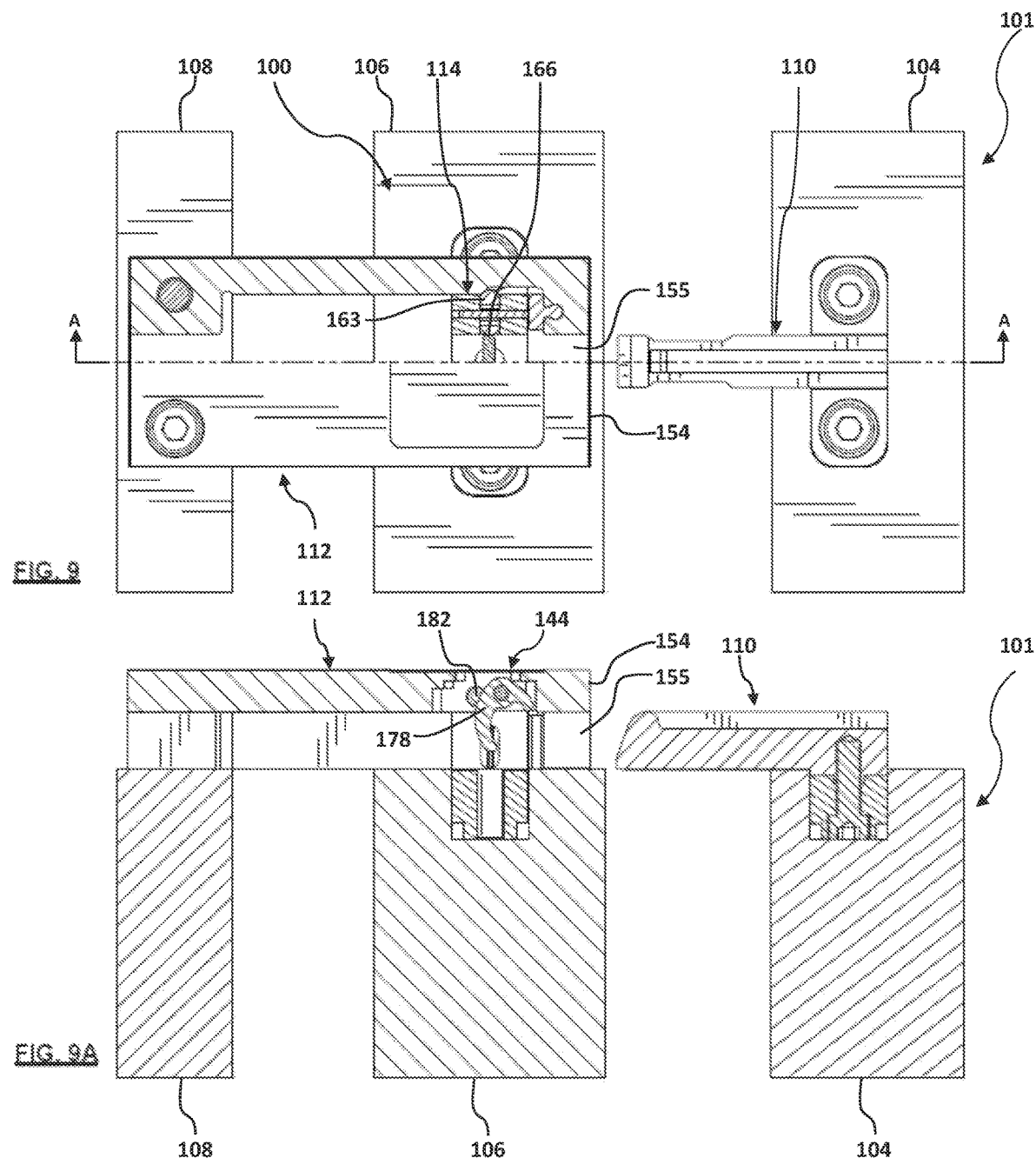

MOLD LATCH AND MOLD HAVING MOLD LATCH

RELATED APPLICATIONS

This application claims the benefit of prior U.S. Application No. 63/053,893, filed Jul. 20, 2020, which is incorporated by reference herein in its entirety.

FIELD

The present application relates to injection molding and more particularly, to a mold latch for a mold.

BACKGROUND

Timing the separation of mold plates is a challenge in many molding applications.

SUMMARY

A aspect of the present application provides a mold latch for mounting on a mold having a first plate, a second plate, and a third plate, the second plate positioned between the first plate and third plate, the mold latch comprising: a latch bar, for attaching to the first plate; a housing, for attaching to the third plate, including a frame having two sidewalls and an opening through which the latch bar can pass, a traveler, for attaching to the second plate, including two sidewalls received between the two sidewalls of the frame and spaced apart to receive the latch bar between the two sidewalls of the traveler; and two linear followers, each of the two linear followers coupled to a respective one of the two sidewalls of the traveler, each of the two linear followers translatable, laterally relative to a respective one of the two sidewalls of the traveler, between an active position and an inactive position, in the active position, the latch bar can co-act with the two linear followers to allow the latch bar to translate with the traveler in a first direction, from the second plate towards the first plate, and in the inactive position, the latch bar cannot co-act with the two linear followers to allow the latch bar to translate with the traveler in the first direction.

The latch bar can include two driving wedge surfaces, each of the two linear followers includes a driven wedge surface, and the latch bar co-acts with the two linear followers by contacting each of the two driving wedge surfaces with the driven wedge surface of a respective one of the two linear followers.

The latch bar can include two opposite lateral surfaces, on a respective one of which a respective one of the two driving wedge surfaces is located.

The mold latch can comprise a rotary follower rotatably mounted to the frame, the rotary follower including two lateral side surfaces, each of the two lateral side surfaces for confining a respective one of the two linear followers in the inactive position.

The rotary follower can include an arm having a rotation driven surface, the latch bar including a rotation driving surface for acting against the rotation driven surface to rotate the rotary follower in an angular direction into a position to confine the two linear followers in the inactive position.

The rotary follower can include an another arm angularly spaced apart from the arm and having an another rotation driven surface, the latch bar including an another rotation driving surface for acting against the another rotation driven surface to rotate the rotary follower in an another angular direction opposite to the angular direction.

The another arm can include the two lateral side surfaces of the rotary follower.

The latch bar can include a head and a neck narrower than the head, the two driving wedge surfaces extending between the neck and the head, each of the two sidewalls of the frame including an internal boundary surface with an inner boundary portion and an outer boundary portion such that when the two linear followers co-act with the latch bar to move with the latch bar in the first direction, the two linear followers are laterally confined between the inner boundary portion of the frame and the neck of the latch bar.

The latch bar can include a top surface defining an axially extending recess having the rotation driving surface sloping towards the top surface and a distal end of the latch bar, the another rotation driving surface is facing away from the rotation driving surface and sloping towards the top surface and a proximal end of the latch bar.

Each of the two sidewalls of the traveler can define a slot extending laterally through each of the respective one of the two sidewalls of the traveler, each of the two linear follower is received in and translatable within the slot of a respective one of the two sidewalls of the traveler to co-act with the latch bar in the active position or be confined in the inactive position.

The arm of the rotary follower can be received in the recess of the latch bar when the rotary follower is ready to enable the rotation driving surface to act against the rotation driven surface to rotate the rotary follower in the angular direction into the position to confine the two linear followers in the inactive position.

The frame can include a driving wedge surface, one on each of the two sidewalls of the frame, between the inner boundary portion and the outer boundary portion, each of the two linear follower includes an another driven wedge surface shaped to co-act with the driving wedge surface of the frame to enable the linear follower to move from the outer boundary portion into the inner boundary portion when the latch bar translates in a second direction opposite of the first direction.

The mold latch can comprise a bumper at a wall of the housing to limit the extent the traveler can translate in the first direction.

The mold latch can comprise a brake to hold the rotary follower in the position to confine the two linear followers in the inactive position.

Another aspect of the present application provides a mold assembly comprising: a first plate, a second plate, and a third plate, the second plate positioned between the first plate and third plate; and a mold latch including: a latch bar attached to the first plate; a housing, attached to the third plate, including a frame having two sidewalls and an opening through which the latch bar can pass, a traveler, attached to the second plate, including two sidewalls received between the two sidewalls of the frame and spaced apart to receive the latch bar between the two sidewalls of the traveler; and two linear followers, each of the two linear followers coupled to a respective one of the two sidewalls of the traveler, each of the two linear followers translatable, laterally relative to a respective one of the two sidewalls of the traveler, between an active position and an inactive position, in the active position, the latch bar can co-act with the two linear followers to allow the latch bar to translate with the traveler in a first direction, from the second plate towards the first plate, and in the inactive position, the latch bar cannot co-act with the two linear followers to allow the latch bar to translate with the traveler in the first direction.

BRIEF DESCRIPTION OF DRAWINGS

The drawings are not to scale.

FIG. 9 is a top partially sectioned view of the mold latch taken along line X-X of FIG. 1, shown mounted on a mold and positioned at a fourth stage in an operational sequence thereof.

FIG. 9A is a sectional view of FIG. 9 taken along line A-A.

DESCRIPTION

Specific embodiments of the present application are now described with reference to the figures, wherein like reference numbers indicate identical or functionally similar elements. The following detailed description is merely exemplary in nature and is not intended to limit the application or the application and uses of the application. As used herein, the term "axial" refers to longitudinally aligned with or parallel to an opening and closing axis of a molding machine and the term "lateral" refers to a direction that is perpendicular to the opening and closing axis of a molding machine. Furthermore, there is no intention to be bound by any expressed or implied theory presented in the preceding field, background, summary, or the following detailed description.

Figure 1:
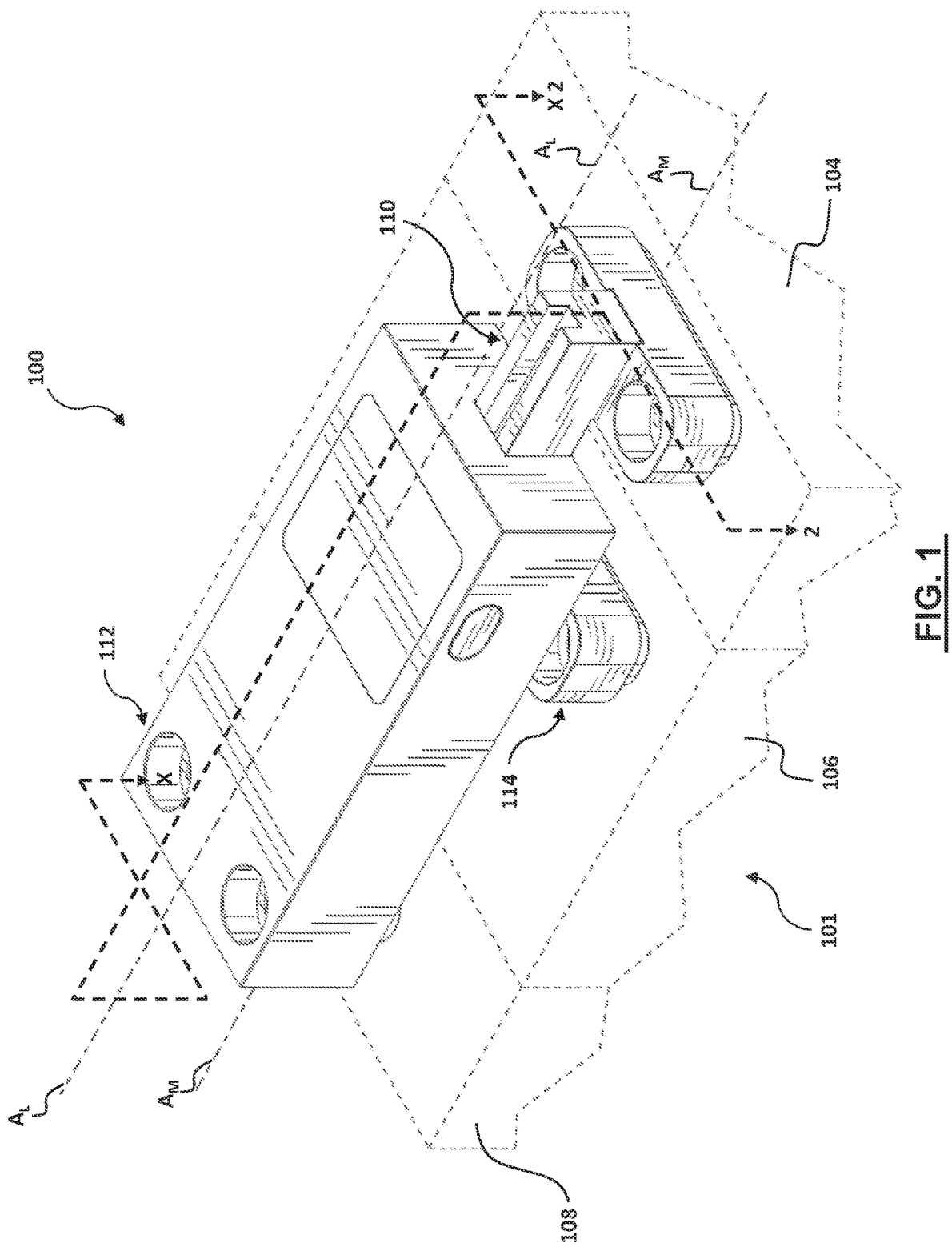
FIG. 1 is a top perspective view of a mold latch in accordance with an embodiment of the present application.
Figure 2:
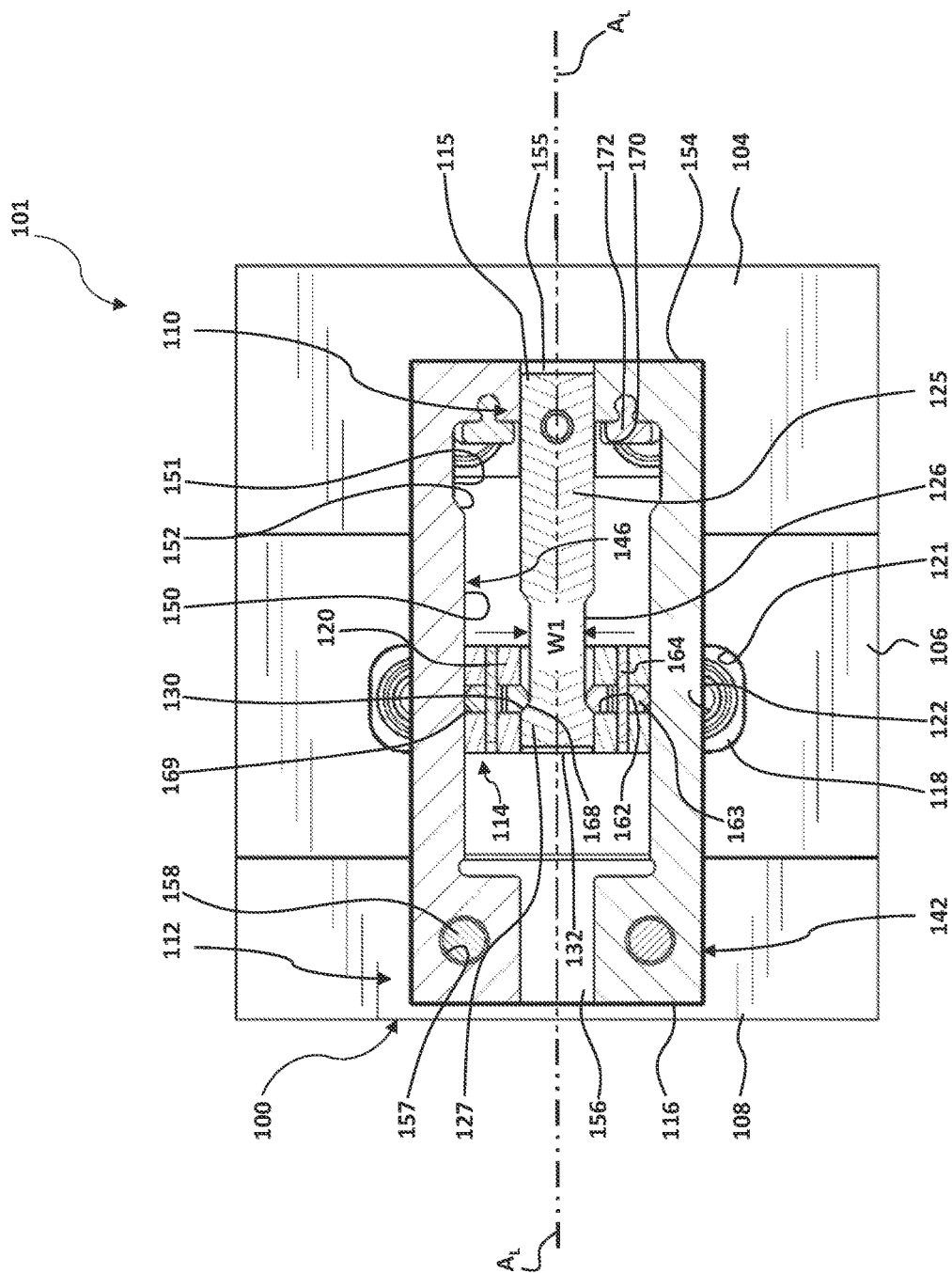
FIG. 2 is a sectional view of FIG. 1 taken along line 2-2.
Figure 3:
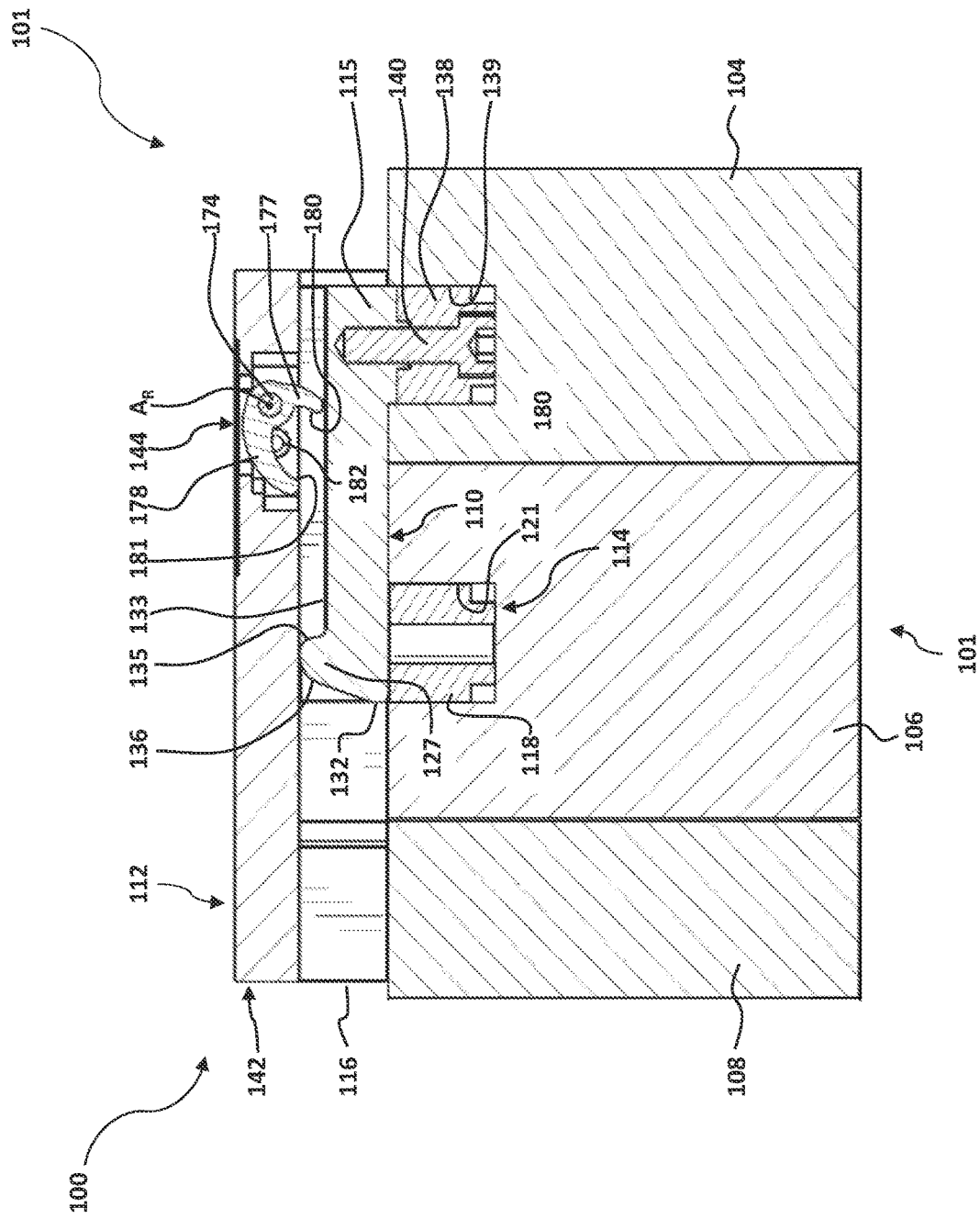
FIG. 3 is a sectional view of FIG. 1 taken through a latch axis of the mold latch.

FIG. 1 is a top perspective view of a mold latch 100 in accordance with an embodiment of the present application, shown positioned relative to a mold 101 as it would be in operation. Mold 101 includes a first mold plate 104, a second mold plate 106 and a third mold plate 108. Second mold plate 106 is between first mold plate 104 and third mold plate 108. Mold latch 100 attaches to mold 101 such that a latch axis $A_L$ of mold latch 100 is parallel to an opening and closing axis $A_M$ of mold 101. Mold latch 100 is used to control a separation sequence and stroke length of mold plates 104, 106, 108 in molding applications such as three-plate molding, two-step parting, two-stage ejection and cavity side ejection. Continuing with FIG. 1 and referring to FIGS. 2 and 3 in which FIG. 2 is a sectional view of FIG. 1 taken along line 2-2 and FIG. 3 is a sectional view of FIG. 1 taken through latch axis $A_L$ and mold axis $A_M$. Mold latch 100 includes a latch bar 110 a housing 112, and a traveler 114. A proximal end 115 of Latch bar 110 attaches to first mold plate 104, traveler 114 attaches to second mold plate 106, and proximal end 116 of housing 112 attaches to third mold plate 108.

As used herein the phrase "first direction" refers to relative axial movement between latch bar 110, housing 112, and traveler 114 which results in latch bar 110 being moved away from housing 112 (or in the direction from second mold plate 106 towards first mold plate 104). Conversely, the phrase "second direction" refers to relative axial movement between latch bar 110, housing 112, and traveler 114 which results in latch bar 110 being moved into housing 112.

Figure 4:
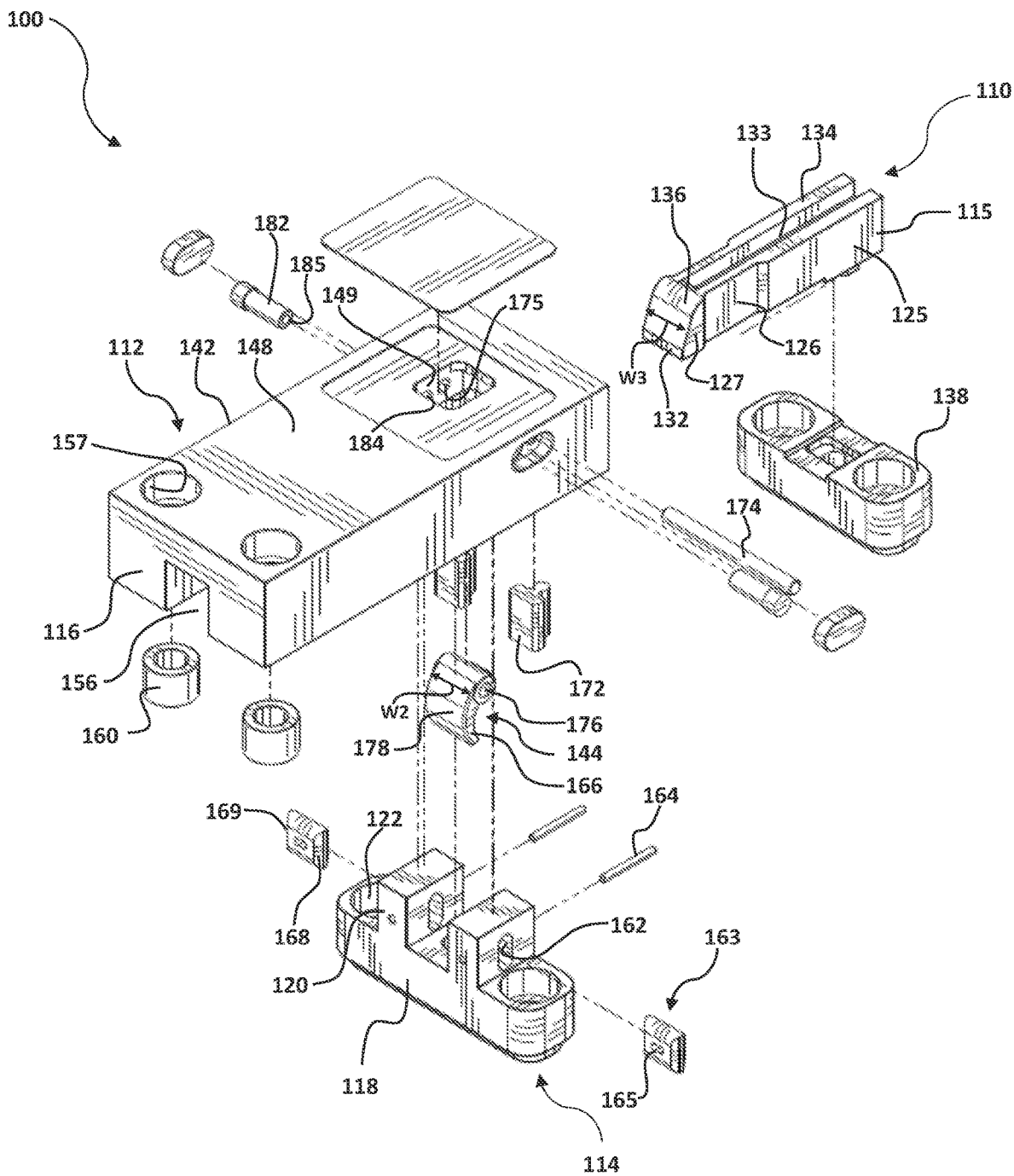
FIG. 4 is top exploded view of the mold latch of FIG. 1.
Figure 5:
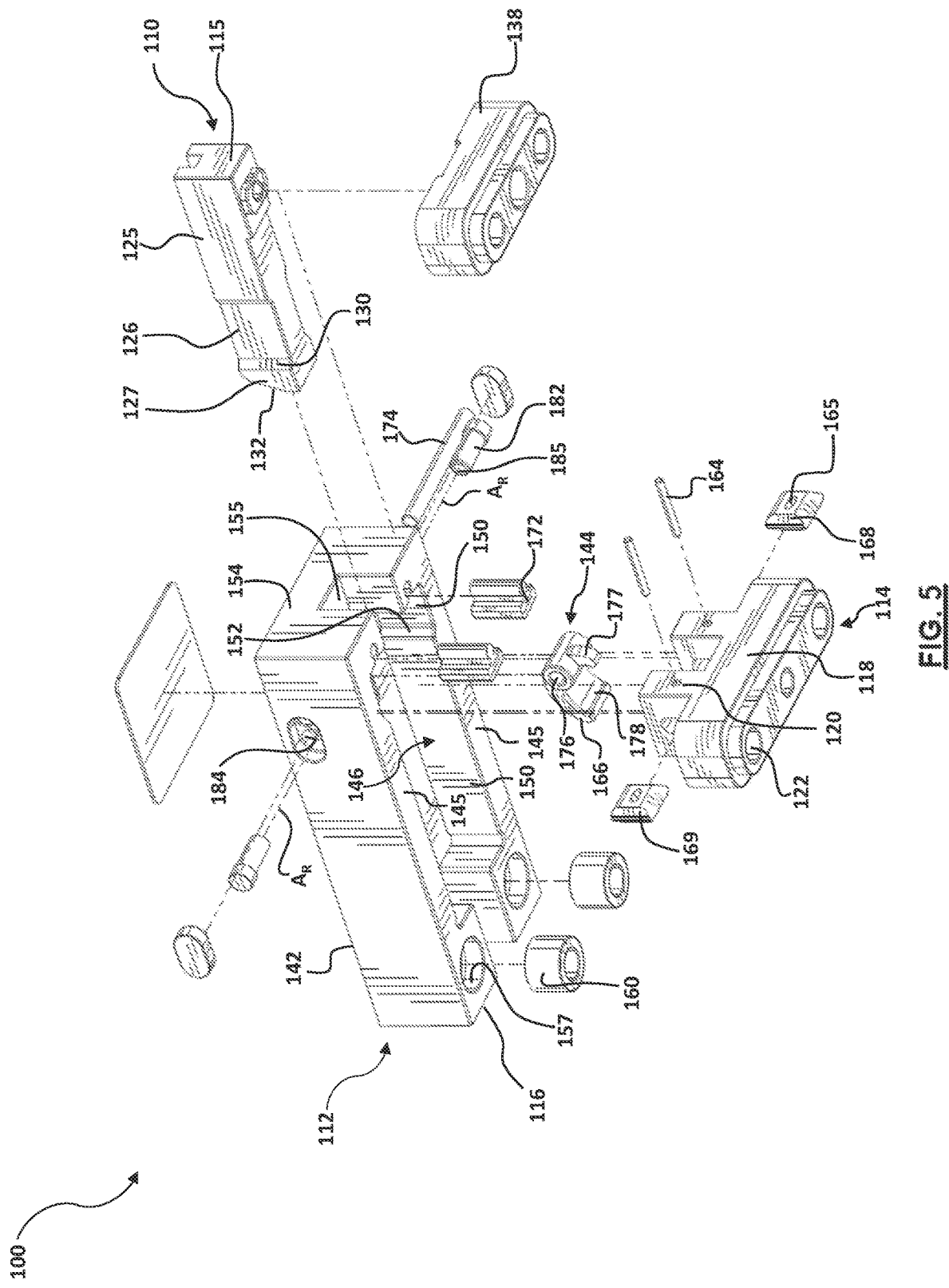
FIG. 5 is bottom exploded view of the mold latch of FIG. 1.

Continuing with FIGS. 2 and 3 and referring to FIGS. 4 and 5 in which FIG. 4 is top exploded view of mold latch 100, and FIG. 5 is bottom exploded view of mold latch 100 of FIG. 1, traveler 114 is axially translatable within housing 112 and includes a base 118 and sidewalls 120 that project from base 118 and away from mold 101. As shown in FIG. 2, sidewalls 120 are spaced apart to allow latch bar 110 to pass therebetween. In the illustrated embodiment shown herein, base 118 is received in a closely sized pocket 121 in second mold plate 106, as shown in FIGS. 2 and 3, to align traveler 114 with mold axis $A_M$. Base 118 includes a bore 122 through which a fastener (not shown) is installable to attach traveler 114 to second mold plate 106. As shown, base 118 projects laterally beyond sidewalls 120.

Latch bar 110 includes a body 125, a neck 126 and a head 127. A width W1 (see FIG. 2) of neck 126 is narrower than body 125 and head 127. A first driving wedge surface 130 (see FIGS. 2 and 5) extends between neck 126 and head 127. First driving wedge surface 130 slopes laterally outward, relative to latch axis $A_L$, towards a distal end 132 of latch bar 110. Latch bar 110 further includes an axial recess 133 (see FIGS. 3 and 4) on its top side 134. A distal end of axial recess 133 slopes towards top side 134 and a distal end 132 of latch bar 110 to define a first rotation driving surface 135 (see FIG. 3). At its distal end 132, latch bar 110 includes a second rotation driving surface 136 (see FIGS. 3 and 4) that faces away from first rotation driving surface 135 and slopes towards top side 134 and proximal end 115.

Latch bar 110 is attached to first mold plate 104 via a laterally extending mounting block 138 at proximal end 115. Mounting block 138 is received in a closely sized pocket 139 in first mold plate 104 (see FIG. 3) which aligns latch bar 110 with latch axis $A_L$. Mounting block 138 is secured in pocket 139 by a fastener (not shown). In the illustrated embodiment shown herein mounting block 138 and latch bar 110 are separate components that are attached together, by, for example a fastener 140. Alternatively, latch bar 110 and mounting block 138 can be a unitary component (not shown). Alternatively, mounting block 138 can be omitted and latch bar 110 can be secured to first mold plate by fasteners (not shown) that extend through latch bar body 125.

Housing 112 includes a frame 142 and a rotary follower 144. Frame 142 includes a pair of sidewalls 145 (see FIG. 5), each sidewall 145 having a boundary surface 146 that faces latch axis AL. In the illustrated embodiment shown herein, housing 112 includes a covering wall 148 (see FIG. 4) that extends between sidewalls 145. As shown, covering wall 148 includes a window 149 through which rotary follower 144 is visible.

Referring to FIGS. 2 and 5, boundary surface 146 includes inner and outer boundary portions 150, 151 which are longitudinally aligned with latch axis $A_L$. In the illustrated embodiments, the spacing between opposing inner boundary portions 150 is shorter than that of opposing outer boundary portions 151. Inner boundary portions 150, are spaced apart to closely receive traveler sidewalls 120 therebetween. Boundary surface 146 further includes a second driving wedge surface 152 that extends between inner boundary portion 150 and outer boundary portion 151. Second driving wedge surface 152 slopes inward towards latch axis $A_L$ and towards proximal end 116 of housing 112.

At its distal end 154, housing 112 includes a distal opening 155 through which latch bar 110 passes as latch bar 110 is withdrawn from and inserted into housing 112 during relative axial movement therebetween (see FIG. 5). As shown, housing 112 also includes a proximal opening 156 at its proximal end 116 (see FIGS. 2 and 4). Latch bar 110 can travel through proximal opening 156 when mold plates 104, 106, 108 are abutted together. However, depending on the length of latch bar 110, proximal opening 156 can be omitted if latch bar 110 does not need to travel through proximal opening 156.

Referring to FIGS. 4 and 5, in the illustrated embodiment shown herein, housing 112 includes bores 157 at its proximal end 116 through which respective fasteners 158 (see FIG. 2) are installable to attach housing 112 to third mold plate 108. As shown in FIG. 4, bores 157 are sized to receive respective tubular dowels 160, which are also receivable in third mold plate 108 to align housing 112 with latch axis $A_L$. Tubular dowels 160 are optional and can be omitted if not needed. Alternatively, housing 112 can be attached to third mold plate 108 by a mounting block similar to mounting block 138 of latch bar 110 described above (not shown).

Referring to FIGS. 2 and 4, traveler 114 includes a slot 162 that extends laterally through traveler sidewall 120 and a linear follower 163, is received in slot 162. To facilitate handling traveler 114, for example, while assembling mold latch 100 to mold 101, a retainer 164, for example a spring dowel, extends axially through sidewall 120, into lateral slot 162 and is received in an axial opening 165 in linear follower 163. However, depending on the application, retainer 164 and axial opening 165 can be omitted. (As can be seen in the figures, there are two sidewalls 120, two linear followers 163, and two slots 162, but to simplify the description, this application will mostly use the singular reference to describe these features.)

Linear follower 163 is laterally translatable within slot 162 between an active position (see FIG. 2) and an inactive position (see FIG. 9). In its active position (see FIG. 2), linear follower 163 is laterally confined between inner boundary portion 150 and neck 126 (see FIG. 2) and latch bar 110 can co-act with linear followers 163 to allow latch bar 110 to translate with traveler 114 in the first direction (i.e., from second mold plate 106 towards first mold plate 104). In its active position, linear followers 163 couples latch bar 110 and traveler 114 together so that when latch bar 110 is moved in the first direction and first wedge driving surface 130 bears against first wedge driven surface 168, latch bar 110 and traveler 114 move together. In its inactive position (see FIG. 9), linear follower 163 is laterally confined between second driving wedge surface 152 and two lateral surfaces 166, opposite to each other, of rotary follower 144 whereby latch bar 110 and traveler 114 are decoupled (i.e., latch bar 110 cannot co-act with linear followers 163 to allow latch bar 110 to translate with traveler 144 in the first direction).

Continuing with FIGS. 2, 4, and 5, linear follower 163 includes a first driven wedge surface 168 and a second driven wedge surface 169. First driven wedge surface 168 shaped to co-act with first driving wedge surface 130 of latch bar 110 so that as mold latch 100 is translated in the first direction, first driving wedge surface 130 contacts and applies lateral force against first driven wedge surface 168 in a direction away from latch axis $A_L$ which pushes linear follower 163 from its active position to its inactive position. Second driven wedge surface 169 shaped to co-act with second driving wedge surface 152 of housing 112 so that as mold latch 100 is translated in the second direction, second driving wedge surface 152 applies lateral force against second driven wedge surface 169 in a direction towards latch axis $A_L$ which pushes linear follower 163 from its inactive position to its active position.

In its active position, linear follower 163 couples latch bar 110 and traveler 114 together so that when latch bar 110 is moved in the first direction and first wedge driving surface 130 bears against first wedge driven surface 168, latch bar 110 and traveler 114 move together. With linear follower 163 in its active position, when latch bar 110 is translated in the first direction and first driving wedge surface 130 pulls against first driven wedge surface 168, latch bar 110 and traveler 114 move in unison. Although first driving wedge surface 130 applies lateral force against first driven wedge surface 168, inner boundary portion 150 restricts outward lateral movement of linear follower 163. Unison movement of latch bar 110 and traveler 114 continues until lateral movement of linear follower 163 is no longer restricted by inner boundary portion 150 and first driving wedge surface 130 acts against first driven wedge surface 168 to push linear follower 163 laterally outward to its second position wherein latch bar 110 and traveler 114 are decoupled. Upon decoupling, linear follower 163 is briefly confined between second driving wedge surface 152 and latch bar head 127 until latch bar 110 moves past linear follower 163, at which point linear follower 163 is confined between second driving wedge surface 152 and lateral surface 166 of rotary follower 144. Once decoupled from latch bar 110, traveler 114 is restricted from continuing in the first direction by a distal end wall 170 (see FIG. 2) of housing 112, which acts as a first direction movement boundary for traveler 114. In the illustrated embodiment shown herein, housing 112 further includes a bumper 172, coupled to distal end wall 170. Bumper 172 is made from a compressible material which absorbs the impact of traveler 114 reaching its first axial direction translation boundary. Alternatively, bumper 172 can be coupled to traveler 114 so as to face distal end wall 170 (not shown), or bumper 172 can be omitted.

Referring to FIGS. 3 and 5, rotary follower 144 holds linear follower 163 in its inactive position when latch bar 110 and traveler 114 are decoupled. This arrangement allows latch bar 110 to pass between traveler walls 120 when mold latch 100 is translated in the second direction. Rotary follower 144 is coupled to housing 112 so as to be rotatable about a rotational axis $A_R$ (see FIGS. 3 and 5) that extends laterally between sidewalls 145. In the illustrated embodiment shown herein, rotatable coupling between rotary follower 144 and housing 112 is realized by an axle 174 that is received in an axle bore 175 in housing sidewalls 145 and extends through a hub 176 of rotary follower 144 (see FIGS. 4 and 5).

Rotary follower 144 includes a first arm 177 that extends outward from rotational axis $A_R$ and a second arm 178 extends outward from rotational axis $A_R$ and is angularly spaced apart from first arm 177. Referring to FIG. 3, first arm 177 includes a first rotation driven surface 180 that faces second arm 178 and second arm 178 includes a second rotation driven surface 181 that faces first arm 177. A width of first arm 177 is sized to be received in recess 133. As shown in in the illustrated embodiment herein, first and second arms 177, 178 can be described as having an arcuate cross-sectional shape. (In the illustrated embodiments, lateral surfaces 166 is located on second arm 178.)

Rotary follower 144 is rotatable between an inactive position (see FIGS. 3, 6A, and 13A) and an active position (see FIGS. 8-10A). When rotary follower 144 is in its inactive position, second arm 178 is axially misaligned with latch bar 110 and first rotation driven surface 180 is axially aligned with first rotation driving surface 135 so that as mold latch 110 is translated in the first direction, latch bar 110 acts upon first arm 177 rather than second arm 178.

When rotary follower 144 is in its active position, second arm 178 holds linear follower 163 in its inactive position. One way of achieving this is to size a width W2 of second arm 178 to be equal to or greater than a width W3 of latch bar head 127 (see FIG. 4), which allows latch bar 110 to pass between traveler walls 120 when mold latch 100 is translated in the second direction. When rotary follower 144 is in its active position first arm 177 is misaligned with latch bar 110 and second rotation driven surface 181 is axially aligned with second rotation driving surface 136 so that as mold latch 110 is translated in the second direction, latch bar 110 acts upon second arm 178 rather than first arm 177. When mold latch 100 is translated in the first direction, first rotation driving surface 135 of latch bar 110 acts against first rotation driven surface 180 to rotate rotary follower 144 in a first angular direction, shown by arrow A in FIG. 6A, from its inactive position to its active position. Conversely, when mold latch 100 is translated in the second direction, second rotation driving surface 136 of latch bar 110 acts against second rotation driven surface 181 to rotate rotary follower 144 in a second angular direction, shown by arrow B in FIG. 10A, opposite to the first rotating direction, from its active position to its inactive position. In the illustrated embodiment shown herein, between its active and inactive positions, latch bar 110 rotates rotary follower 144 about rotary axis $A_R$ by an angle of about 90 degrees.

Housing 112 includes a brake 182 that presses against rotary follower 144 to hold rotary follower 144 in its active and inactive positions. In the illustrated embodiment shown herein, brake 182 is a ball plunger secured in a brake bore 184 that extends laterally through housing sidewall 145 and is adjacent to axle bore 175. A ball portion 185 of the ball plunger is depressed by second arm 178 to create a holding force against lateral surface 166 which holds rotary follower 144 in place when rotary follower 144 is in its active and inactive positions.

Referring now to FIGS. 6-13 and corresponding FIGS. 6A to 13A which are an operational sequence depicting mold latch 100 in use to control the opening and closing sequence of mold 101.

Figure 6:
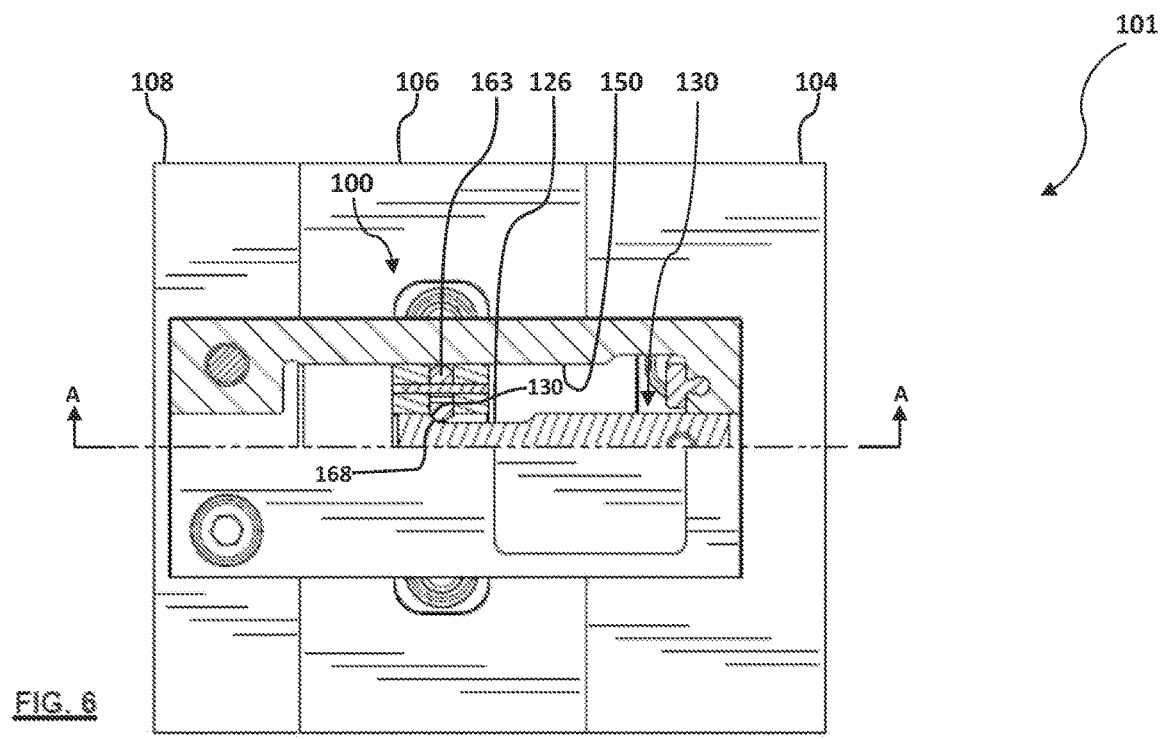
FIG. 6 is a top partially sectioned view of the mold latch taken along line X-X of FIG. 1, shown mounted on a mold and positioned at a first stage in an operational sequence thereof.
Figure 6A:
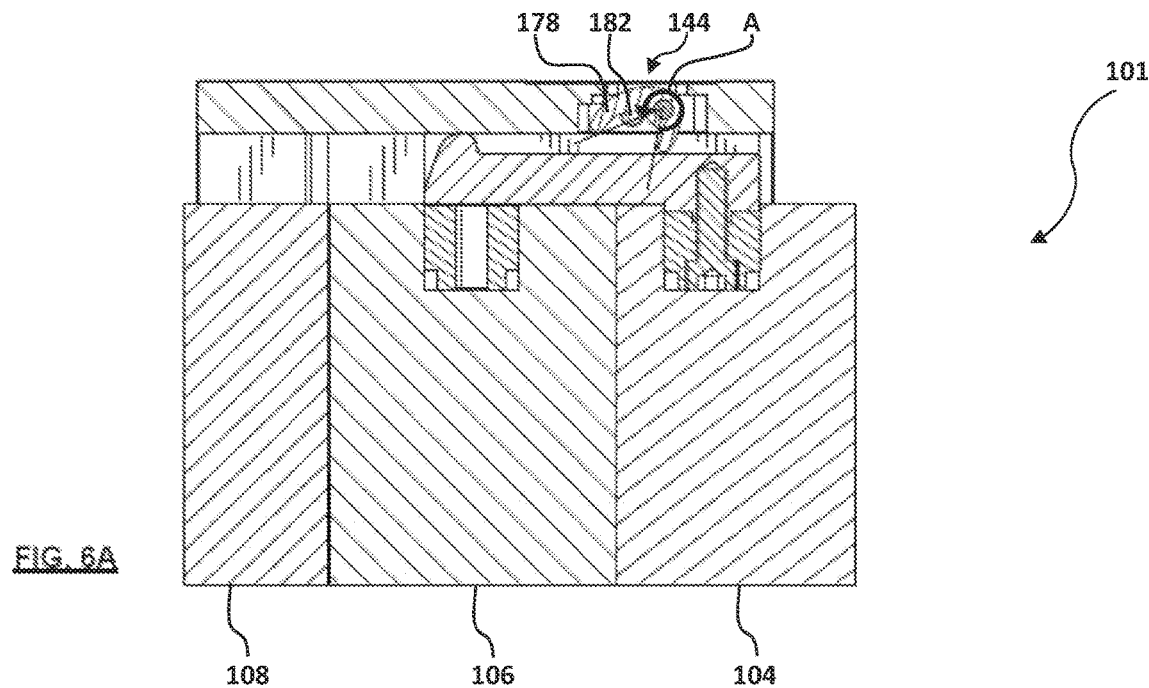
FIG. 6A is a sectional view of FIG. 6 taken along line A-A.

FIG. 6 is a top partially sectioned view of mold latch 100 taken along line X-X of FIG. 1 shown mounted on mold 101 and positioned at a first stage in an operational sequence thereof. FIG. 6A is a sectional view of FIG. 6 taken along line A-A. Mold plates mold plates 104, 106, 108 are abutted together. In this configuration mold latch 100 can be described as being in a contracted configuration. Linear follower 163, is in its active position between inner boundary portion 150 and neck 126. First driving wedge surface 130 of latch bar 110 opposes first driven wedge surface 168 of linear follower 163. In this configuration, upon moving first mold plate 104 away from third mold plate 108, second mold plate 106 moves therewith. As shown in FIG. 6A, rotary follower 144 is held in its inactive position by brake 182 pressing against second arm 178.

Figure 7:
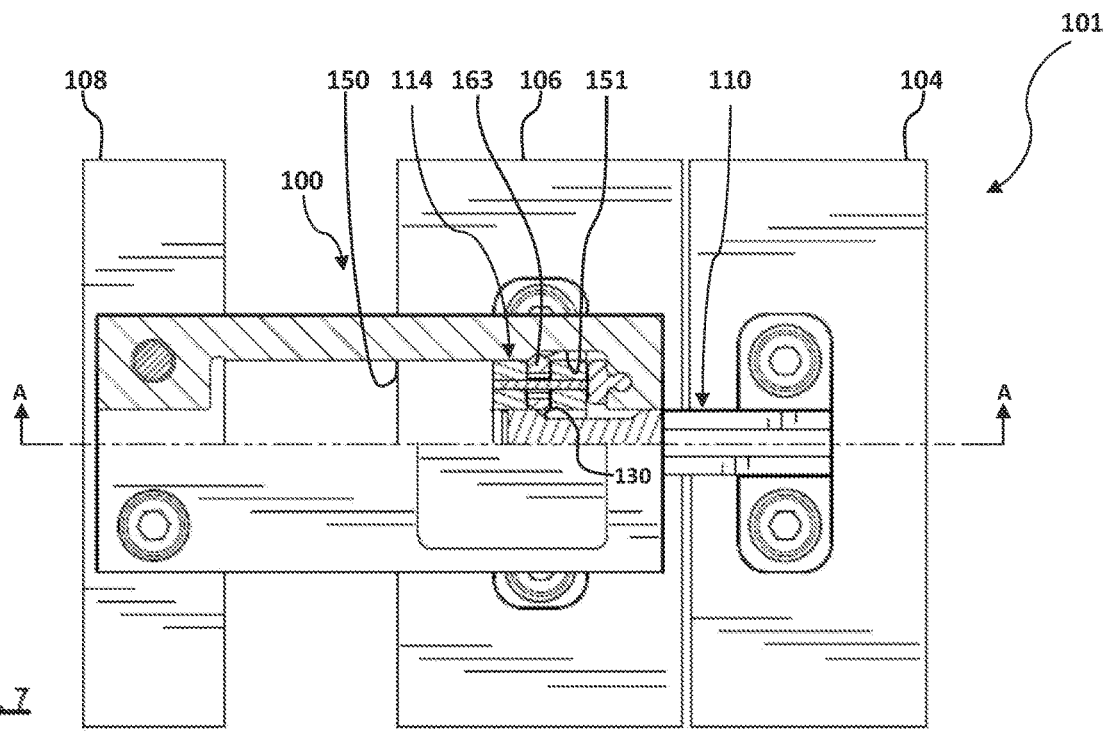
FIG. 7 is a top partially sectioned view of the mold latch taken along line X-X of FIG. 1, shown mounted on a mold and positioned at a second stage in an operational sequence thereof.
Figure 7A:
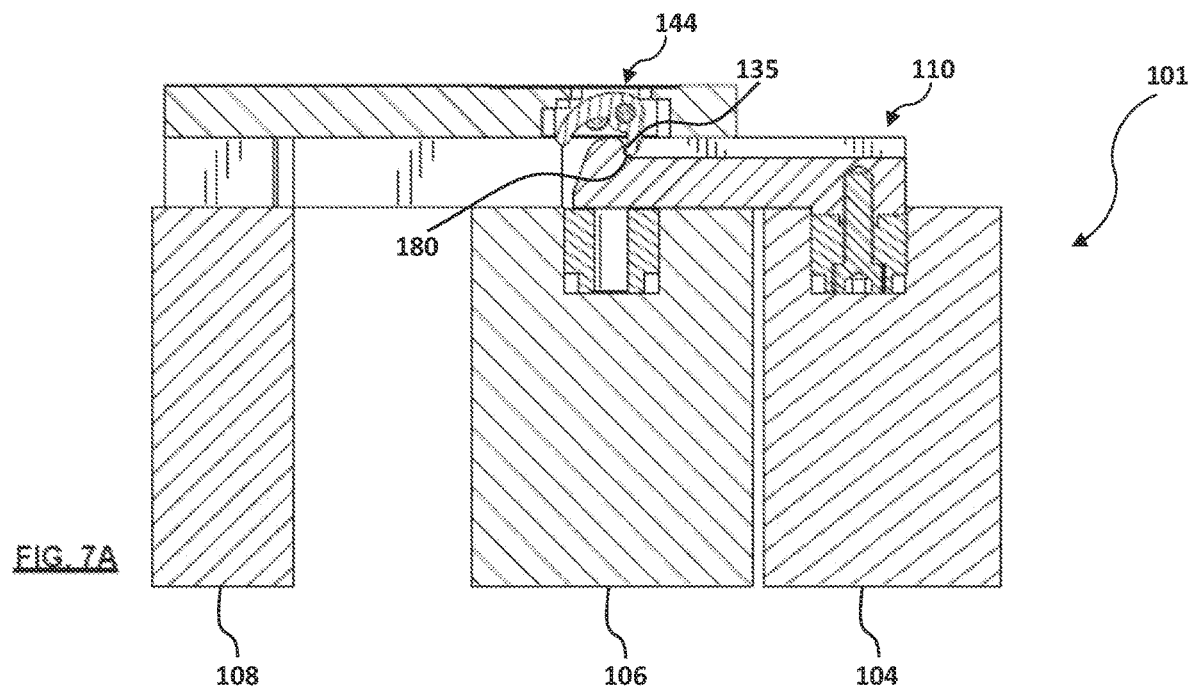
FIG. 7A is a sectional view of FIG. 7 taken along line A-A.

FIG. 7 is a top partially sectioned view of mold latch 100 taken along line X-X of FIG. 1 shown mounted on mold 101 and positioned at a second stage in an operational sequence thereof. FIG. 7A is a sectional view of FIG. 7 taken along line A-A. First and second mold plates 104, 106 are moved away from third mold plate 108. Having past inner boundary portion 150, first driving wedge surface 130 has pushed linear follower 163 away from latch axis $A_L$ towards outer boundary portion 151 to decouple latch bar 110 from traveler 114. Once decoupled, first mold plate 104 separates from second mold plate 106. As shown in FIG. 7A, first rotation driving surface 135 of latch bar 110 begins to contact first rotation driven surface 180 of rotary follower 144.

Figure 8:
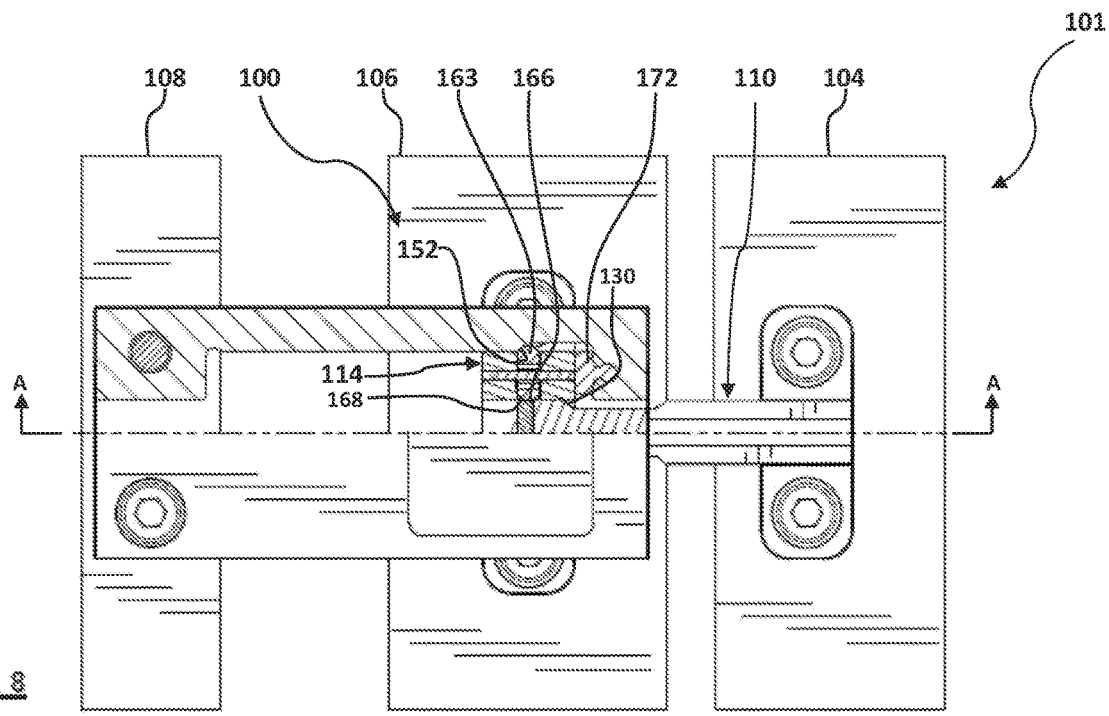
FIG. 8 is a top partially sectioned view of the mold latch taken along line X-X of FIG. 1, shown mounted on a mold and positioned at a third stage in an operational sequence thereof.
Figure 8A:
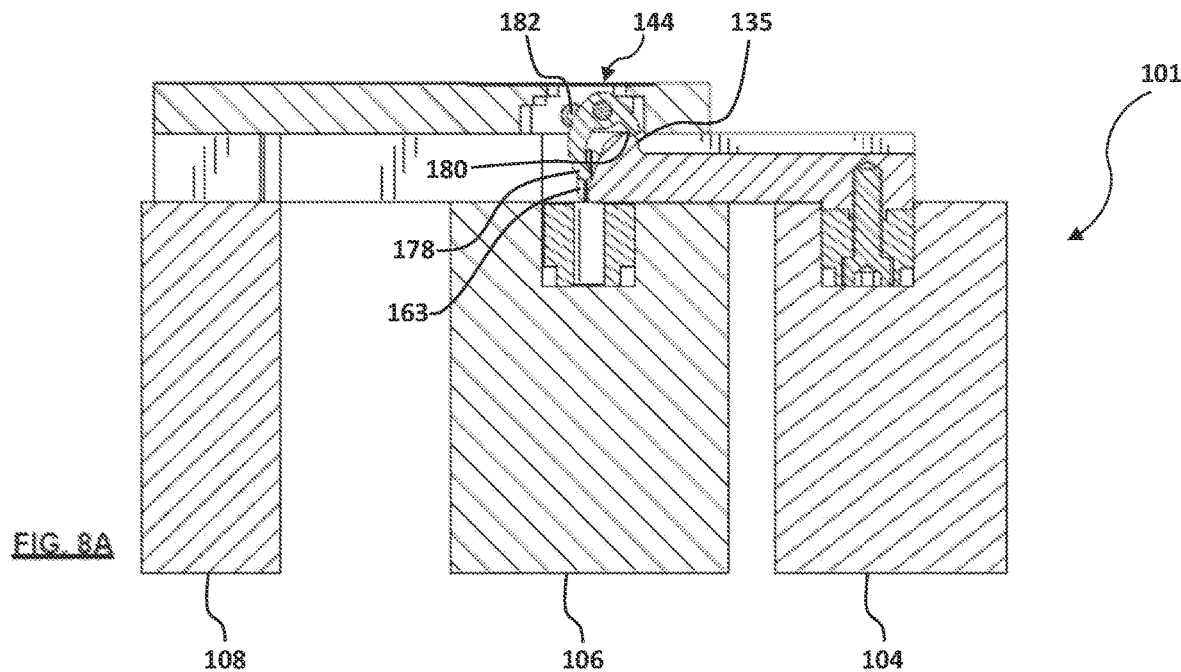
FIG. 8A is a sectional view of FIG. 8 taken along line A-A.

FIG. 8 is a top partially sectioned view of mold latch 100 taken along line X-X of FIG. 1 shown mounted on mold 101 and positioned at a third stage in an operational sequence thereof. FIG. 8A is a sectional view of FIG. 8 taken along line A-A. First driven wedge surface 168 is disengaged from first driving wedge surface 130 of latch bar 110 which frees first mold plate 104 to further separate from second mold plate 106. Rotary follower 144 is in its active position holding linear follower 163 in its inactive position between lateral surface 166 of rotary follower 144 and second driving wedge surface 152. Traveler 114 abuts bumper 172 which prevents further axial movement of traveler 114 and second mold plate 106. As shown in FIG. 8A, first rotation driving surface 135 has further acted upon first rotation driven surface 180 to move rotary follower 144 to its active position in which linear follower 163 is held in its inactive position by second arm 178. Rotary follower 144 is held in its active position by brake 182 pressing against second arm 178.

FIG. 9 is a top partially sectioned view of mold latch 100 taken along line X-X of FIG. 1 shown mounted on mold 101 and positioned at a fourth stage in an operational sequence thereof. FIG. 9A is a sectional view of FIG. 9 taken along line A-A. Mold plates 104, 106, 108 are fully separated; latch bar 110 and traveler 114 are decoupled and latch bar 110 is withdrawn through distal opening 155 at distal end 154 of housing 112. As shown in FIG. 9A, rotary follower 144 is held in its active position by brake 182 pressing against second arm 178.

Figure 10:
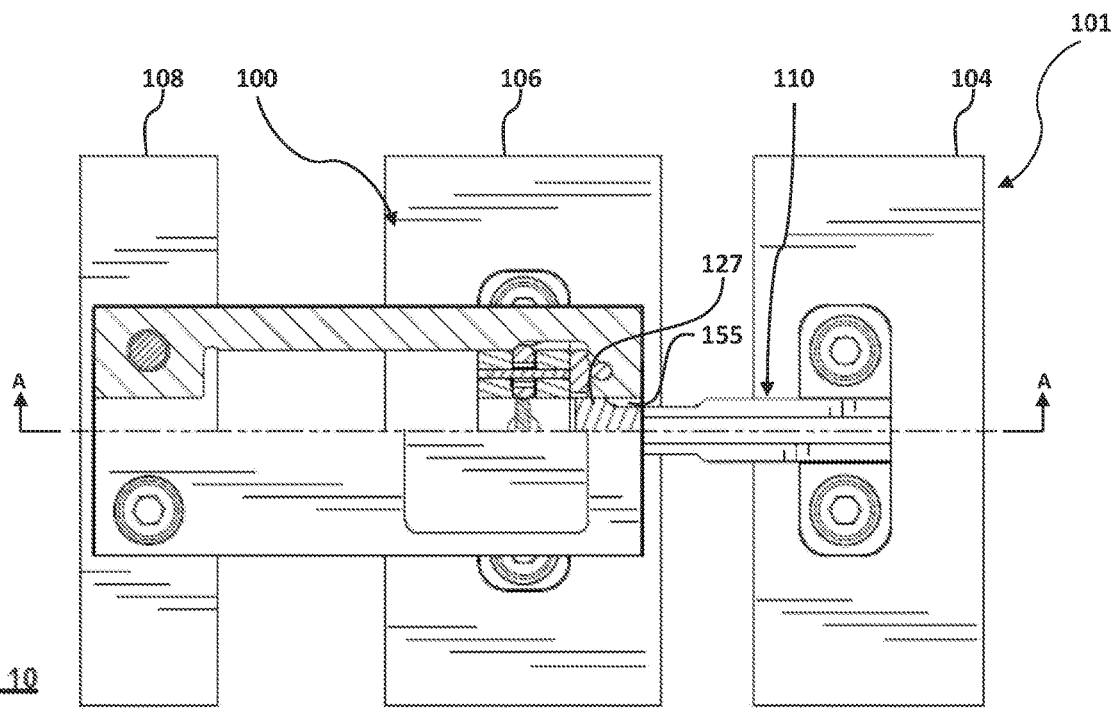
FIG. 10 is a top partially sectioned view of the mold latch taken along line X-X of FIG. 1, shown mounted on a mold and positioned at a fifth stage in an operational sequence thereof.
Figure 10A:
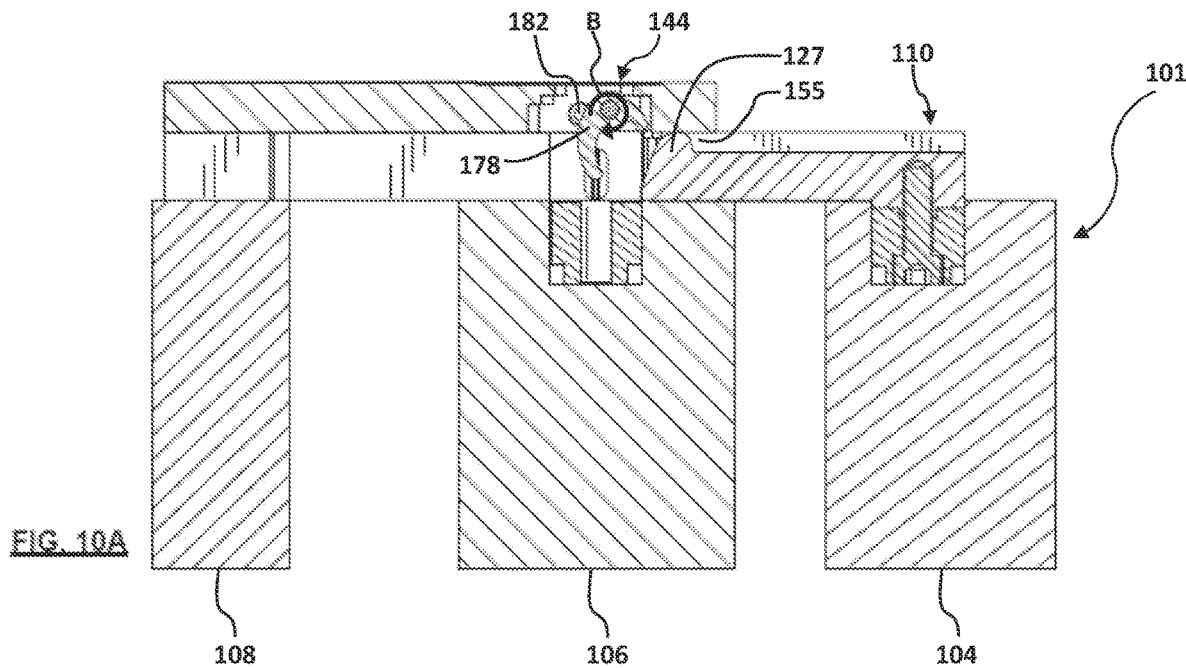
FIG. 10A is a sectional view of FIG. 10 taken along line A-A.

FIG. 10 is a top partially sectioned view of mold latch 100 taken along line X-X of FIG. 1 shown mounted on mold 101 and positioned at a fifth stage in an operational sequence thereof. FIG. 10A is a sectional view of FIG. 10 taken along line A-A. First mold plate 104 has begun moving towards second mold plate 106 and head 127 of latch bar 110 has entered distal opening 155. As shown in FIG. 10A, rotary follower 144 is maintained in its active position by brake 182 pressing against second arm 178.

Figure 11:
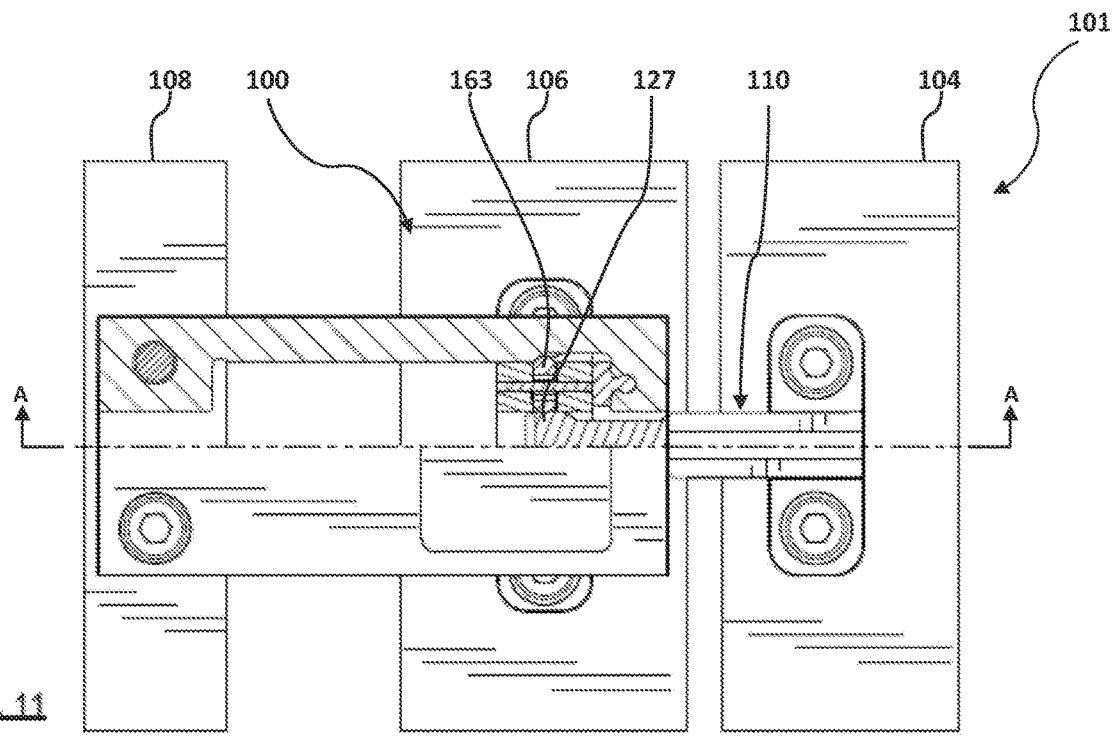
FIG. 11 is a top partially sectioned view of the mold latch taken along line X-X of FIG. 1, shown mounted on a mold and positioned at a sixth stage in an operational sequence thereof.
Figure 11A:
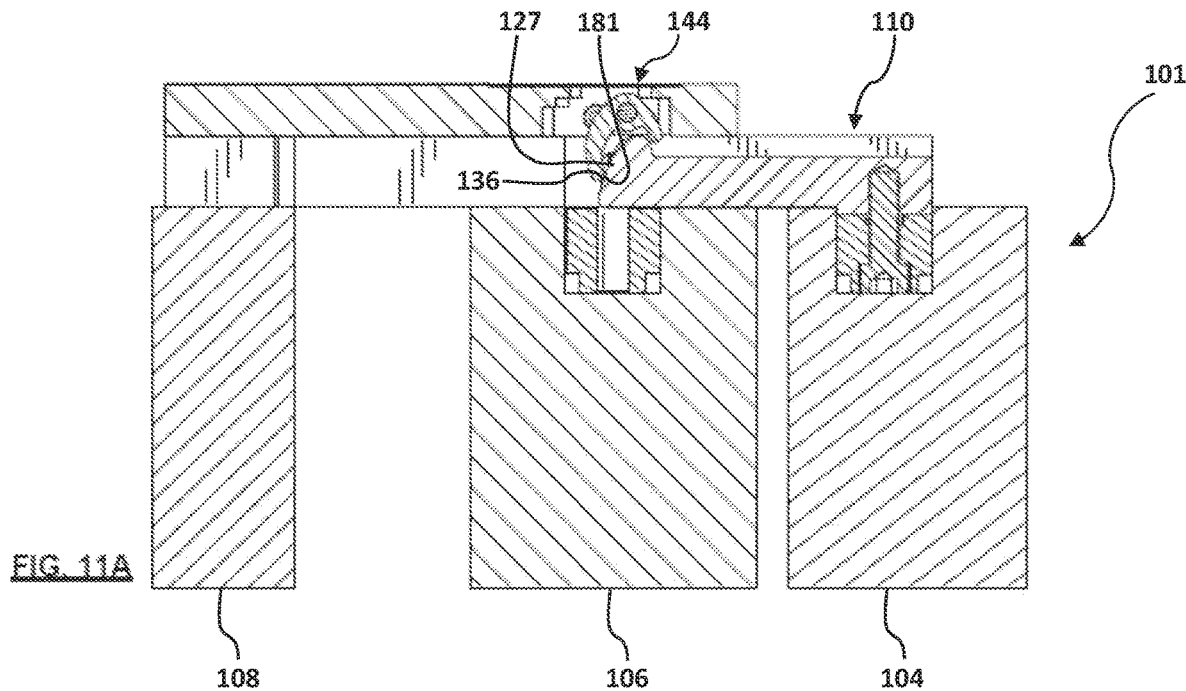
FIG. 11A is a sectional view of FIG. 11 taken along line A-A.

FIG. 11 is a top partially sectioned view of mold latch 100 taken along line X-X of FIG. 1 shown mounted on mold 101 and positioned at a sixth stage in an operational sequence thereof. FIG. 11A is a sectional view of FIG. 11 taken along line A-A. First mold plate 104 is further moved towards second mold plate 106. Second rotation driving surface 136 of latch bar 110 has acted upon second rotation driven surface 181 to move rotary follower 144 away from its active position, and linear follower 163 is held in its inactive position by head 127 of latch bar 110.

Figure 12:
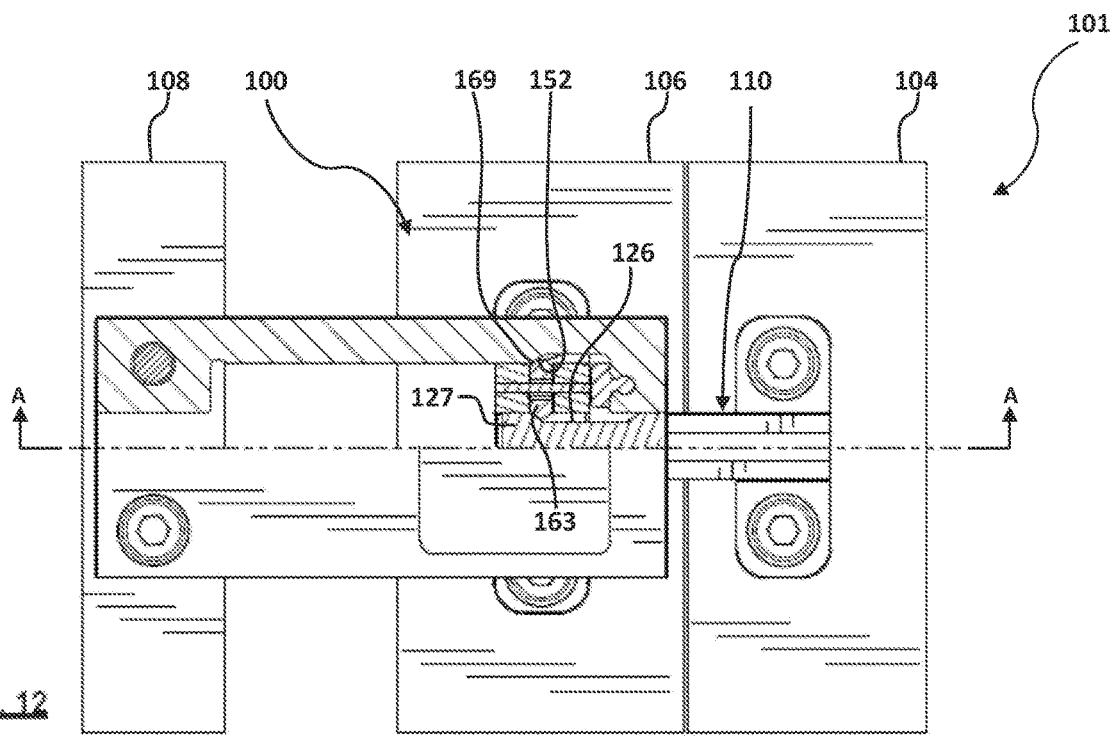
FIG. 12 is a top partially sectioned view of the mold latch taken along line X-X of FIG. 1, shown mounted on a mold and positioned at a seventh stage in an operational sequence thereof.
Figure 12A:
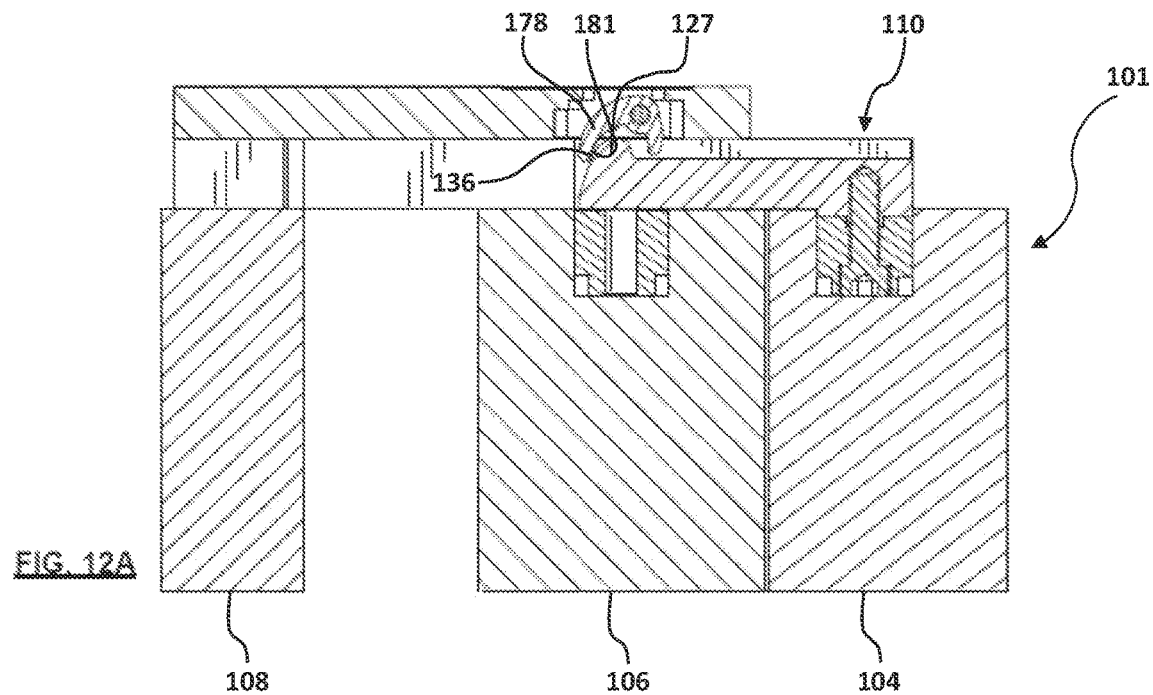
FIG. 12A is a sectional view of FIG. 12 taken along line A-A.

FIG. 12 is a top partially sectioned view of mold latch 100 taken along line X-X of FIG. 1 shown mounted on mold 101 and positioned at a seventh stage in an operational sequence thereof. FIG. 12A is a sectional view of FIG. 12 taken along line A-A. Further movement of first mold plate 104 towards second mold plate 106 moves head 127 of latch bar 110 beyond linear follower 163. Second driving wedge surface 152 has acted upon second driven wedge surface 169 to push linear follower 163 towards neck 126. Once first mold plate 104 abuts second mold plate 106, first and second mold plates 104, 106 move in unison and second driving wedge surface 152 further acts upon second driven wedge surface 169 to push linear follower 163 to its active position. As shown in FIG. 12A, second rotation driving surface 136 of latch bar 110 continues to act upon second rotation driven surface 181 of second arm 178 to move rotary follower 144 further towards its inactive position.

Figure 13:
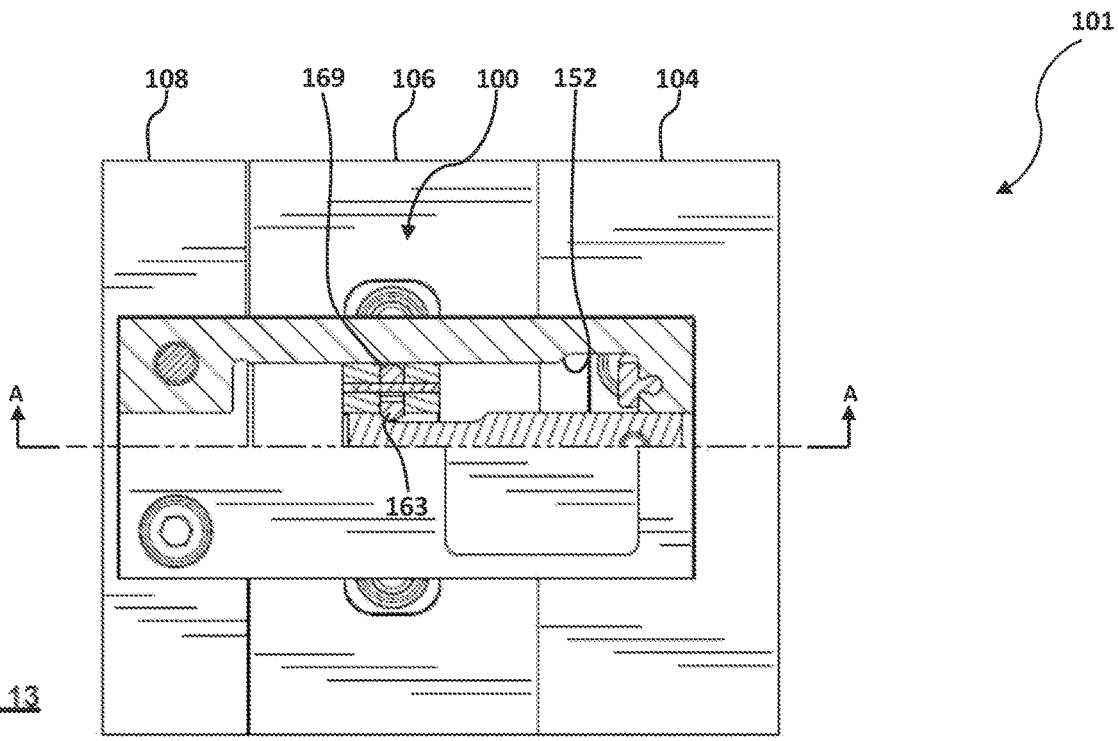
FIG. 13 is a top partially sectioned view of the mold latch taken along line X-X of FIG. 1, shown mounted on a mold and positioned at an eighth stage in an operational sequence thereof.
Figure 13A:
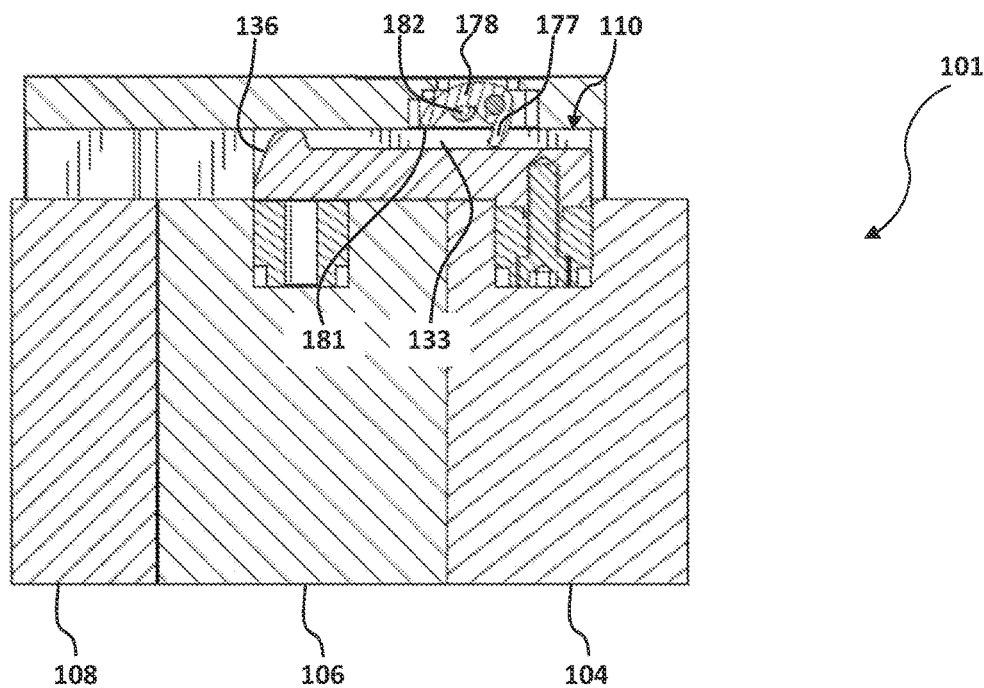
FIG. 13A is a sectional view of FIG. 13 taken along line A-A.

FIG. 13 is a top partially sectioned view of mold latch 100 taken along line X-X of FIG. 1 shown mounted on mold 101 and positioned at an eighth stage in an operational sequence thereof. FIG. 13A is a sectional view of FIG. 13 taken along line A-A. Second mold plate 106 is pushed by first mold plate 104 into abutment with third mold plate 108. Second driving wedge surface 152 has acted upon second driven wedge surface 169 to move linear follower 163 to its active position. As shown in FIG. 13A, second rotation driving surface 136 of latch bar 110 has acted upon second rotation driven surface 181 to rotate rotary follower 144 such that first arm 177 is in axial recess 133 whereby rotary follower 144 is in its inactive position. Rotary follower 144 is held its inactive position by brake 182 pressing against second arm 178.

As shown herein, mold latch 100 is mounted to a top side of mold 101; however, mold latch 100 can also be mounted to a bottom side of mold 101 or a lateral side of mold 101. Although only one mold latch 110 is shown mounted to mold 101, typically mold latch 100 is mounted to mold 101 in pairs, with one of the pair of mold latches 100 mounted to one side of mold 101 and the other of the pair of mold latches 100 mounted to the opposite side of mold 101.

What is claimed is:

1. A mold latch for mounting on a mold having a first plate, a second plate, and a third plate, the second plate positioned between the first plate and third plate, the mold latch comprising:
   a latch bar, for attaching to the first plate;
   a housing, for attaching to the third plate, including a frame having two sidewalls and an opening through which the latch bar can pass;
   a traveler, for attaching to the second plate, including two sidewalls received between the two sidewalls of the frame and spaced apart to receive the latch bar between the two sidewalls of the traveler; and
   two linear followers, each of the two linear followers coupled to a respective one of the two sidewalls of the traveler, each of the two linear followers translatable, laterally relative to a respective one of the two sidewalls of the traveler, between an active position and an inactive position, in the active position, the latch bar can co-act with the two linear followers to allow the latch bar to translate with the traveler in a first direction, from the second plate towards the first plate, and in the inactive position, the latch bar cannot co-act with the two linear followers to allow the latch bar to translate with the traveler in the first direction,
   wherein the latch bar includes two driving wedge surfaces, each of the two linear followers includes a driven wedge surface, and the latch bar co-acts with the two linear followers by contacting each of the two driving wedge surfaces with the driven wedge surface of a respective one of the two linear followers,
   wherein the latch bar includes two opposite lateral surfaces, on a respective one of which a respective one of the two driving wedge surfaces is located,
   the mold latch further comprising a rotary follower rotatably mounted to the frame, the rotary follower including two lateral side surfaces, each of the two lateral side surfaces for confining a respective one of the two linear followers in the inactive position,
   wherein the rotary follower includes an arm having a rotation driven surface, the latch bar including a rotation driving surface for acting against the rotation driven surface to rotate the rotary follower in an angular direction into a position to confine the two linear followers in the inactive position, and
   wherein the rotary follower includes an another arm angularly spaced apart from the arm and having an another rotation driven surface, the latch bar including an another rotation driving surface for acting against the another rotation driven surface to rotate the rotary follower in an another angular direction opposite to the angular direction.

2. The mold latch of claim 1, wherein the another arm includes the two lateral side surfaces of the rotary follower.

3. The mold latch of claim 2, wherein the latch bar includes a head and a neck narrower than the head, the two driving wedge surfaces extending between the neck and the head, each of the two sidewalls of the frame including an internal boundary surface with an inner boundary portion and an outer boundary portion such that when the two linear followers co-act with the latch bar to move with the latch bar in the first direction, the two linear followers are laterally confined between the inner boundary portion of the frame and the neck of the latch bar.

4. The mold latch of claim 3, wherein the latch bar includes a top surface defining an axially extending recess having the rotation driving surface sloping towards the top surface and a distal end of the latch bar, the another rotation driving surface is facing away from the rotation driving surface and sloping towards the top surface and a proximal end of the latch bar.

5. The mold latch of claim 4, wherein each of the two sidewalls of the traveler defines a slot extending laterally through each of the respective one of the two sidewalls of the traveler, each of the two linear follower is received in and translatable within the slot of a respective one of the two sidewalls of the traveler to co-act with the latch bar in the active position or be confined in the inactive position.

6. The mold latch of claim 5, wherein the arm of the rotary follower is received in the recess of the latch bar when the rotary follower is ready to enable the rotation driving surface to act against the rotation driven surface to rotate the rotary follower in the angular direction into the position to confine the two linear followers in the inactive position.

7. The mold latch of claim 6, wherein the frame includes a driving wedge surface, one on each of the two sidewalls of the frame, between the inner boundary portion and the outer boundary portion, each of the two linear follower includes an another driven wedge surface shaped to co-act with the driving wedge surface of the frame to enable the linear follower to move from the outer boundary portion into the inner boundary portion when the latch bar translates in a second direction opposite of the first direction.

8. The mold latch of claim 7 further comprising a bumper at a wall of the housing to limit the extent the traveler can translate in the first direction.

9. The mold latch of claim 8 further comprising a brake to hold the rotary follower in the position to confine the two linear followers in the inactive position.

10. A mold assembly comprising:
a first plate, a second plate, and a third plate, the second plate positioned between the first plate and third plate; and a mold latch including:
a latch bar attached to the first plate;
a housing, attached to the third plate, including a frame having two sidewalls and an opening through which the latch bar can pass;
a traveler, attached to the second plate, including two sidewalls received between the two sidewalls of the frame and spaced apart to receive the latch bar between the two sidewalls of the traveler; and
two linear followers, each of the two linear followers coupled to a respective one of the two sidewalls of the traveler, each of the two linear followers translatable, laterally relative to a respective one of the two sidewalls of the traveler, between an active position and an inactive position, in the active position, the latch bar can co-act with the two linear followers to allow the latch bar to translate with the traveler in a first direction, from the second plate towards the first plate, and in the inactive position, the latch bar cannot co-act with the two linear followers to allow the latch bar to translate with the traveler in the first direction,
wherein the latch bar includes two driving wedge surfaces, each of the two linear followers includes a driven wedge surface, and the latch bar co-acts with the two linear followers by contacting each of the two driving wedge surfaces with the driven wedge surface of a respective one of the two linear followers,
wherein the latch bar includes two opposite lateral surfaces, on a respective one of which a respective one of the two driving wedge surfaces is located,
the mold latch further comprising a rotary follower rotatably mounted to the frame, the rotary follower including two lateral side surfaces, each of the two lateral side surfaces for confining a respective one of the two linear followers in the inactive position,
wherein the rotary follower includes an arm having a rotation driven surface, the latch bar including a rotation driving surface for acting against the rotation driven surface to rotate the rotary follower in an angular direction into a position to confine the two linear followers in the inactive position, and
wherein the rotary follower includes an another arm angularly spaced apart from the arm and having an another rotation driven surface, the latch bar including an another rotation driving surface for acting against the another rotation driven surface to rotate the rotary follower in an another angular direction opposite to the angular direction.

* * * * *